(12) United States Patent
Shim

(10) Patent No.: US 11,501,757 B2
(45) Date of Patent: Nov. 15, 2022

(54) ARTIFICIAL INTELLIGENCE APPARATUS

(71) Applicant: LG ELECTRONICS INC., Seoul (KR)

(72) Inventor: Hansuk Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 16/717,975

(22) Filed: Dec. 17, 2019

(65) Prior Publication Data
US 2021/0142786 A1    May 13, 2021

(30) Foreign Application Priority Data
Nov. 7, 2019  (KR) .................. 10-2019-0141677

(51) Int. Cl.
| | |
|---|---|
| G10L 15/22 | (2006.01) |
| G10L 15/08 | (2006.01) |
| G10L 25/78 | (2013.01) |
| G06F 3/16 | (2006.01) |
| G06N 20/00 | (2019.01) |
| G06F 9/54 | (2006.01) |
| G06K 9/62 | (2022.01) |

(52) U.S. Cl.
CPC .............. G10L 15/08 (2013.01); G06F 3/167 (2013.01); G06F 9/542 (2013.01); G06K 9/6268 (2013.01); G06N 20/00 (2019.01); G10L 25/78 (2013.01); *G10L 2015/088* (2013.01)

(58) Field of Classification Search
CPC .............. G10L 15/22; G10L 2015/088; G10L 2015/223; G10L 15/063; G10L 7/04; G10L 25/78; G10L 15/16; G10L 25/30; G10L 25/93; G06N 20/00; G06N 3/0445; G06N 5/04; G06N 3/08
See application file for complete search history.

(56) References Cited

U.S. PATENT DOCUMENTS

| | | | |
|---|---|---|---|
| 10,192,546 B1 * | 1/2019 | Piersol | .................... G10L 17/22 |
| 2013/0085755 A1 * | 4/2013 | Bringert | .................. G10L 15/28 |
| | | | 704/235 |
| 2014/0149118 A1 * | 5/2014 | Lee | .......................... G10L 15/22 |
| | | | 704/251 |
| 2015/0095027 A1 * | 4/2015 | Parada San Martin | ...................... |
| | | | G10L 15/16 |
| | | | 704/255 |
| 2016/0125883 A1 * | 5/2016 | Koya | ....................... G10L 15/22 |
| | | | 704/232 |
| 2017/0103754 A1 * | 4/2017 | Higbie | ..................... G10L 25/78 |
| 2017/0358294 A1 * | 12/2017 | Hatfield | .............. G10L 21/0208 |
| 2018/0232563 A1 * | 8/2018 | Albadawi | ............... H04R 3/005 |
| 2018/0260680 A1 * | 9/2018 | Finkelstein | .............. G06N 5/04 |
| 2018/0308483 A1 * | 10/2018 | Myoung | ................. G10L 15/30 |
| 2019/0102145 A1 * | 4/2019 | Wilberding | ............ H04L 12/282 |
| 2019/0295540 A1 * | 9/2019 | Grima | ...................... G10L 15/22 |

(Continued)

*Primary Examiner* — Olujimi A Adesanya
(74) *Attorney, Agent, or Firm* — Lee, Hong, Degerman, Kang & Waimey PC

(57) ABSTRACT

Disclosed herein is an artificial intelligence apparatus including an input interface configured to receive speech data, and a processor configured to detect a non-utterance interval included in the speech data and determine presence/absence of a second utterance after the non-utterance interval according to characteristics of a first utterance before the non-utterance interval, when the non-utterance interval exceeds a set time.

18 Claims, 9 Drawing Sheets

(56) References Cited

U.S. PATENT DOCUMENTS

2019/0325898 A1* 10/2019 O'Hart Kinney ....... G10L 15/02
2020/0098354 A1* 3/2020 Lin ........................ G10L 15/22

* cited by examiner

ARTIFICIAL INTELLIGENCE APPARATUS

CROSS-REFERENCE TO RELATED APPLICATIONS

Pursuant to 35 U.S.C. § 119(a), this application claims the benefit of earlier filing date and right of priority to Korean Patent Application No. 10-2019-0141677, filed on Nov. 7, 2019, the contents of which are hereby incorporated by reference herein in its entirety.

BACKGROUND

The present disclosure relates to an artificial intelligence (AI) apparatus capable of detecting a non-utterance interval between a first utterance and a second utterance and receiving the second utterance while a speech command according to the first utterance is performed, when the first utterance is received and the second utterance is additionally received.

Recently, speech recognition technology has been applied to various fields. The speech recognition technology may refer to a process of performing conversion such that an artificial intelligence apparatus understands speech data spoken by a user, and a speech recognition service using speech recognition technology may include recognizing the speech of a user and providing a suitable service corresponding thereto.

Currently, when a user speaks toward an apparatus having a speech recognition function, the speech recognition function of the apparatus is activated via a wakeup word. When the speech recognition function is activated, the apparatus may recognize a speech according to a utterance and perform a command corresponding thereto. After the command according to speech recognition is performed, the user may speak a wakeup word again to activate the speech recognition function, and the apparatus may perform a speech command according to the new utterance.

As such, in order for an apparatus having a speech recognition function to perform various operations according to speech recognition, it is necessary to receive a wakeup word several times.

SUMMARY

An object of the present disclosure is to provide an artificial intelligence apparatus capable of receiving speech data, detecting a non-utterance interval, and additionally receiving a second utterance while operation according to a first utterance is performed.

An artificial intelligence apparatus according to the present disclosure may receive speech data, detect a non-utterance interval included in the speech data, and determine presence/absence of a second utterance after the non-utterance interval according to characteristics of a first utterance before the non-utterance interval, when the non-utterance interval exceeds a set time.

When the second utterance is present, the artificial intelligence apparatus may perform a first speech command according to the first utterance while the second utterance is received. In addition, when the second utterance is received, a second speech command according to the second utterance may be performed.

DETAILED DESCRIPTION OF THE EMBODIMENTS

Figure 1:
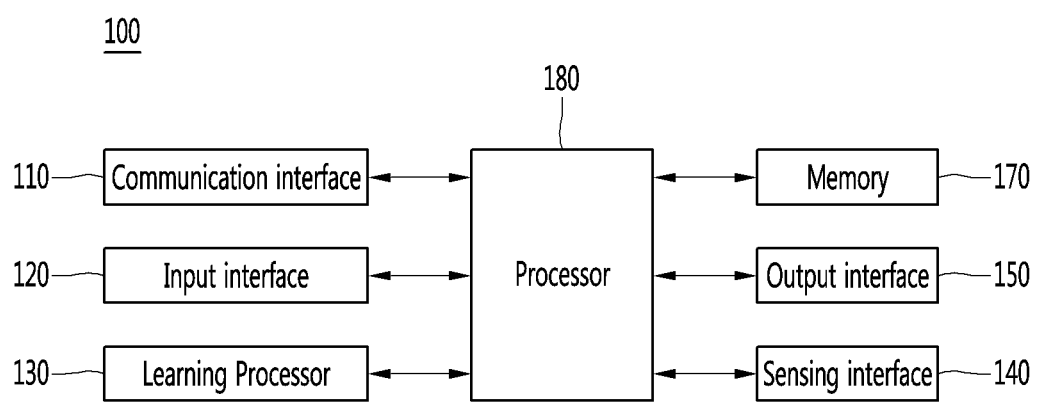
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100*a* to 100*e* and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
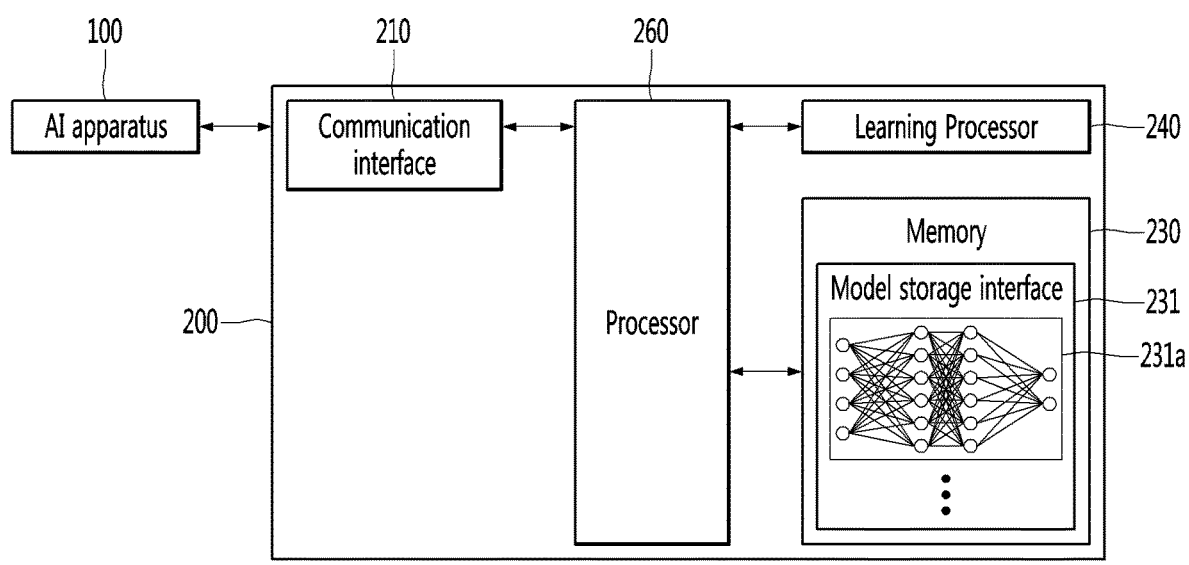
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
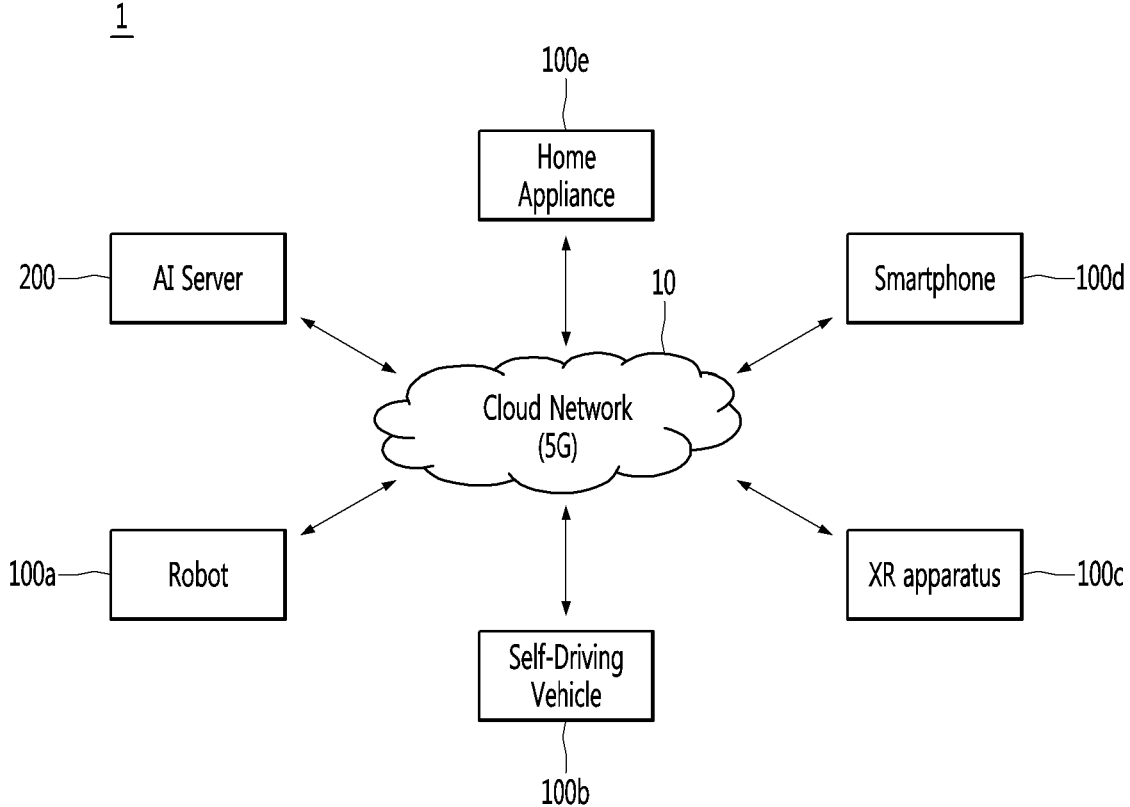
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving interface such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving interface based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
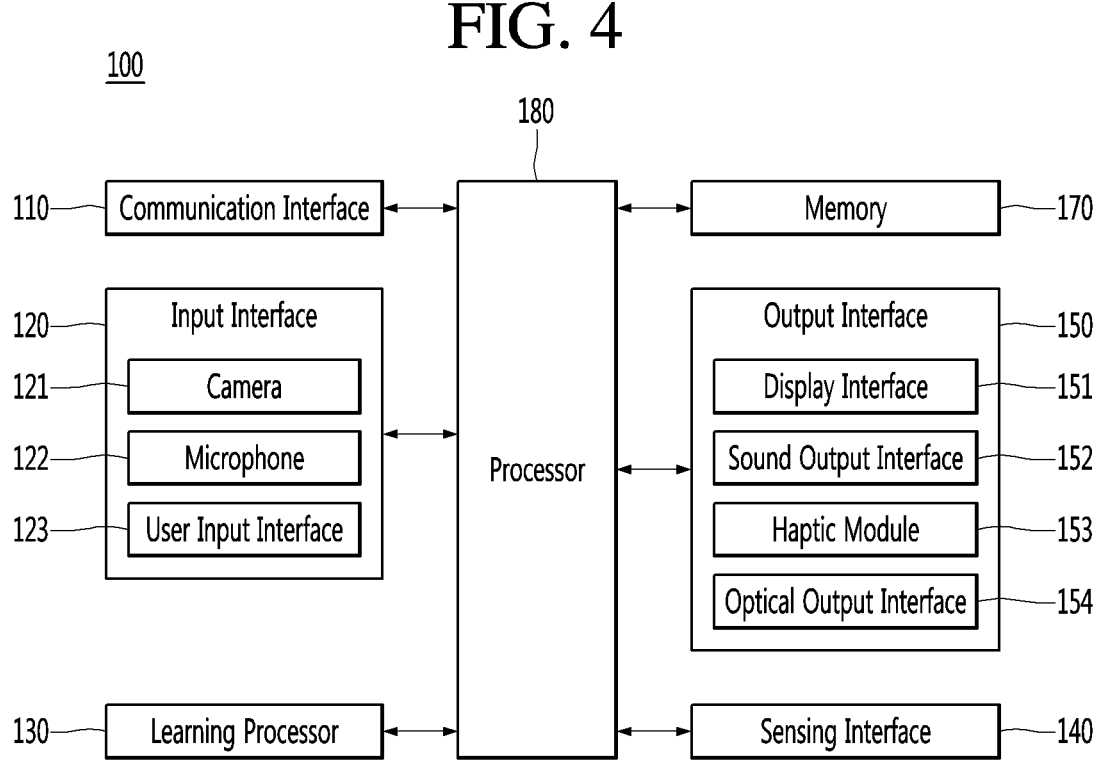
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
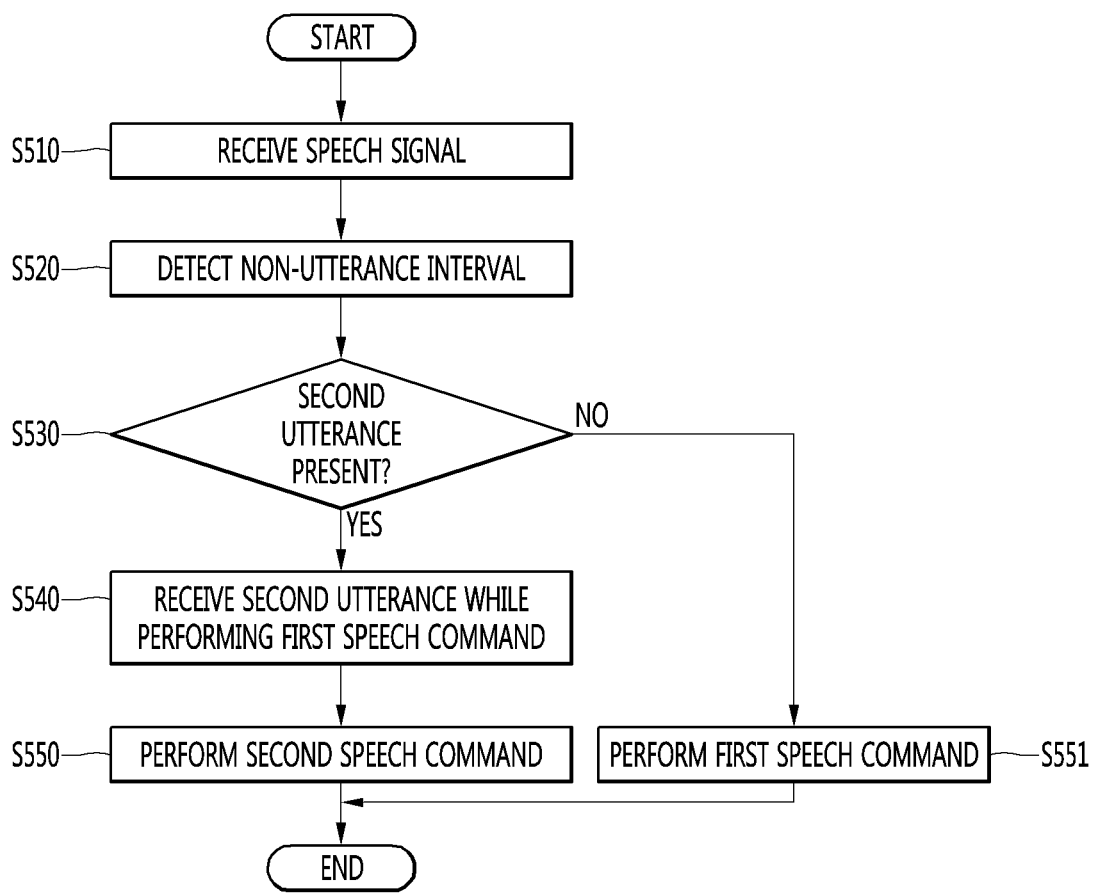
FIG. 5 is a flowchart illustrating an embodiment of the present disclosure.

FIG. 5 is a flowchart illustrating an embodiment of the present disclosure.

Fundamentally, the artificial intelligence apparatus 100 of the present disclosure may be mounted in an apparatus requiring speech recognition to receive an utterance of a user, and control a speech recognition apparatus such that the apparatus requiring speech recognition provides a speech recognition service via recognition and analysis.

Referring to FIG. 5, the input interface 120 of the artificial intelligence apparatus 100 may receive speech data of a user (S510). At this time, the speech data may include data spoken by the user and received by the input interface 120 of the artificial intelligence apparatus 100 or data received from an external device via the communication interface 110 of the artificial intelligence apparatus 100.

Specifically, the speech data of the user may include at least one utterance, at least one non-utterance interval and a wakeup word.

At this time, the wakeup word may mean a specific command for activating a speech recognition function. The speech recognition function may be activated when the utterance of the user includes the wakeup word, and the speech recognition function may be deactivated when the utterance does not include the wakeup word, without being limited thereto.

In addition, activation of the speech recognition function may include activation of a microphone included in the input interface, and deactivation of the speech recognition function may include deactivation of the microphone included in the input interface.

According to the present disclosure, the at least one utterance may include speech data including a speech command to be processed by the processor 180. In addition, the at least one non-utterance interval may include an interval present between speech commands to be processed by the processor 180. For example, the speech data may include a wakeup word, a first utterance, a second utterance and a non-utterance interval between the first utterance and the second utterance.

According to the present disclosure, the processor 180 may detect the non-utterance interval included in the speech data (S520). At this time, the non-utterance interval may include an interval in which there is no speech data input via the input interface 120 or the amplitude of the received speech data is less than a specific value.

The processor 180 may detect the non-utterance interval of the received speech data (S520), and extract an utterance before the non-utterance interval as a first utterance. In addition, the processor 180 may determine presence/absence of the second utterance based on the characteristics of the extracted first utterance (S530). The process S530 will be described in detail with reference to FIG. 6.

According to the present disclosure, the processor 180 may maintain the activated speech recognition upon determining that the second utterance is present based on the characteristics of the first utterance, and perform a first speech command according to the first utterance before the non-utterance interval while the second utterance after the non-utterance interval is received as the activated speech recognition is maintained (S540). In addition, when the second utterance is received, the processor 180 may perform a second speech command according to the second utterance (S550).

According to the present disclosure, the processor 180 may stop the activated speech recognition upon determining that the second utterance is not present based on the characteristics of the first utterance, and perform the first speech command according to the first utterance before the non-utterance interval (S551).

For example, assume that the speech data received by the input interface 120 of the artificial intelligence apparatus 100 is "HI LG! Turn on the TV and um, . . . Mute the TV". At this time, "HI LG!" may be a wakeup word for activating speech recognition of the artificial intelligence apparatus 100. The processor 180 may activate the speech recognition function of the artificial intelligence apparatus 100 when "HI LG" is received.

When the speech recognition function is activated, the processor 180 may detect the non-utterance interval. When "Turn on the TV and um, . . . " is received, the processor 180 may detect an interval " . . . " in which the amplitude of the received speech data is less than a specific value. When " . . . " which is the detected non-utterance interval exceeds a set time, the processor 180 may extract "Turn on the TV and um", which is the speech data before the non-utterance interval, as the first utterance.

The processor 180 may determine presence/absence of an additional utterance after the non-utterance interval according to the characteristics of "Turn on the TV and um" which is the first utterance before the non-utterance interval.

The processor 180 may maintain the activated speech recognition upon determining that the second utterance is present according to the characteristics of "Turn on the TV and um". The processor 180 may receive "mute the TV", which is the second utterance after the non-utterance interval, as the activated speech recognition is maintained.

In addition, the processor 180 may perform the first speech command according to the first utterance before the non-utterance interval while "mute the TV" which is the second utterance is received (S540). That is, the processor 180 may control the TV to perform operation of turning on "the power of the TV" while "mute the TV" is received. In addition, when the second utterance is received, the processor 180 may perform the second speech command according to the second utterance (S550). That is, the processor 180 may control the TV to mute the TV.

Hereinafter, the example of the case where the processor determines that the second utterance is not present will be described.

For example, assume that there is speech data "HI LG! Turn on the TV".

At this time, HI LG! may be a wakeup word for activating speech recognition of the artificial intelligence apparatus 100. When "HI LG" is received, the processor 180 may activate the speech recognition function of the artificial intelligence apparatus 100.

When the speech recognition function is activated, the processor 180 may detect the non-utterance interval. When "Turn on the TV" is received, the processor 180 may detect an interval in which the amplitude of the received speech data is less than the specific value. When the detected non-utterance interval exceeds the set time, the processor 180 may extract "Turn on the TV", which is the speech data before the non-utterance interval, as the first utterance.

The processor 180 may determine whether an additional utterance is present after the non-utterance interval according to the characteristics of "Turn on the TV" which is the first utterance before the non-utterance interval.

The processor 180 may stop the activated speech recognition upon determining that the second utterance is not present according to the characteristics of "Turn on the TV". As the activated speech recognition is stopped, the processor 180 may no longer receive the speech data. Thereafter, the processor 180 may perform the first speech command according to "Turn on the TV" which is the first utterance before the non-utterance interval (S551). That is, the processor 180 may control the TV to turn on the TV.

Figure 6:
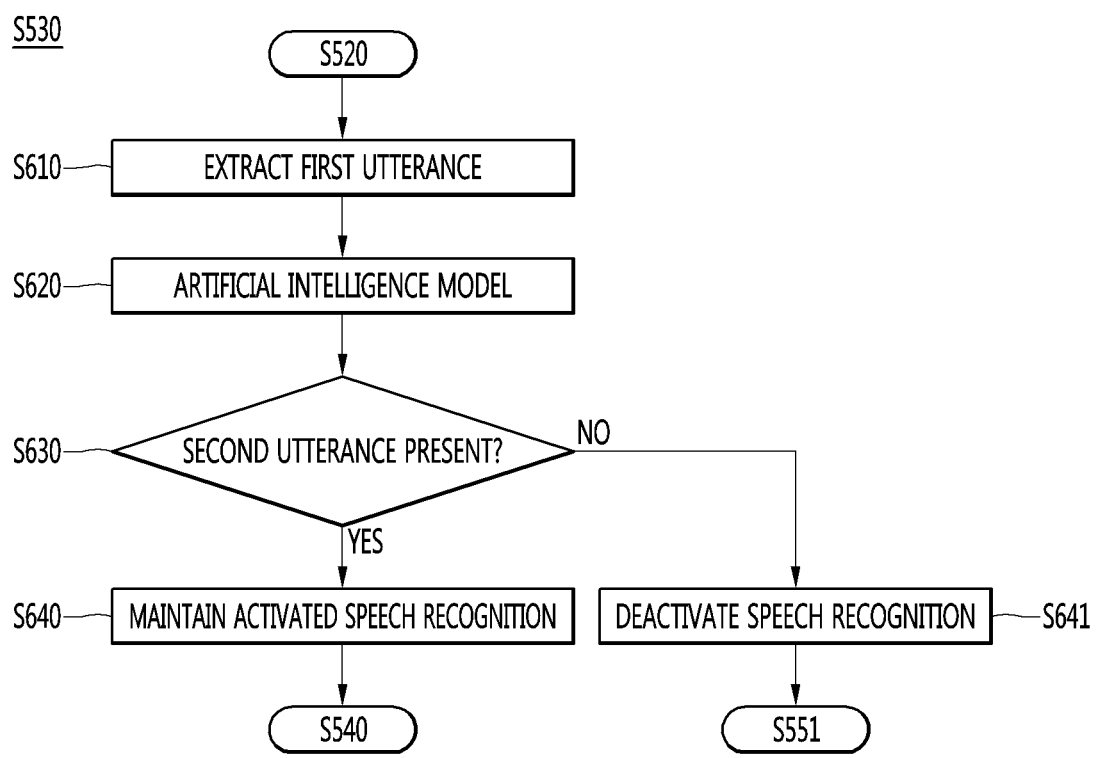
FIG. 6 is a flowchart illustrating an embodiment of the present disclosure.

FIG. 6 is a flowchart illustrating an embodiment of the present disclosure.

Referring to FIG. 6, the processor 180 may extract the utterance before the non-utterance interval as the first utterance (S610), after the non-utterance interval is detected (S520). Specifically, the processor 180 may extract the speech data immediately before the non-utterance interval as the first utterance.

In addition, the processor 180 may input, to an artificial intelligence model, the first utterance extracted to determine presence/absence of the second utterance (S620). Specifically, the processor 180 may input the characteristic data of the first utterance to the artificial intelligence model as an input value 710.

At this time, the characteristic data of the first utterance is a characteristic value representing components useful for speech recognition and may be extracted from the first utterance.

In addition, the characteristic data of the first utterance may include characteristics extracted by applying LPC cepstrum, PLP cepstrum, Mel frequency cepstral coefficient (MFCC), filter band energy used for speech recognition to the first utterance. In addition, the characteristic data of the first utterance input to the artificial intelligence model may include sequence data including speech characteristics and context characteristics of the preprocessed first utterance.

The processor 180 may input the first utterance to the artificial intelligence model and determine presence/absence of the second utterance after the non-utterance interval as a result value (S630). Specifically, the artificial intelligence model may include a classification model for extracting the speech characteristics and the context characteristics of the first utterance and determining presence/absence of the second utterance, when the first utterance is input. Hereinafter, the artificial intelligence model will be described with reference to FIG. 7.

According to the present disclosure, when the result value 730 of the artificial intelligence model is "the second utterance is present (1)", the processor 180 may maintain the activated speech recognition (S640). The processor 180 may perform the first speech command according to the first utterance while the second utterance is received, when the activated speech recognition is maintained (S540). In addition, the processor 180 may perform the second speech command according to the second utterance when the second utterance is received (S550).

According to the present disclosure, when the result value 730 of the artificial intelligence model is "the second utterance is not present (0)", the processor 180 may deactivate the speech recognition function (S641). In addition, the processor may perform the first speech command according to the first utterance without receiving the second utterance (S551).

Figure 7:
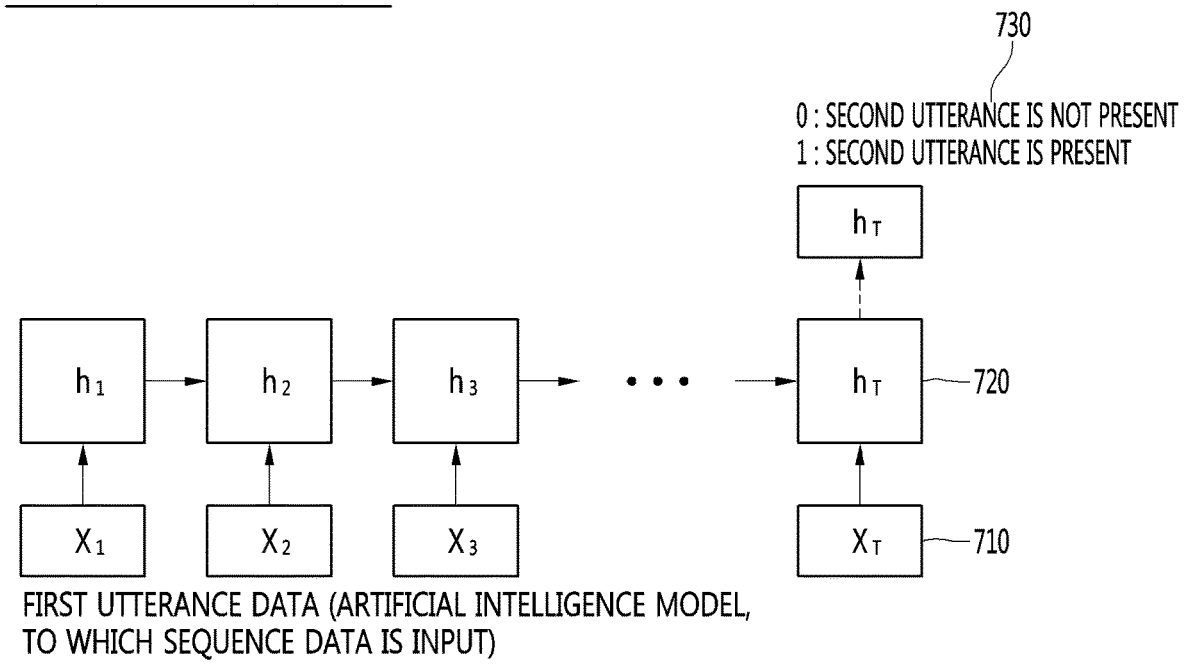
FIG. 7 is a view illustrating an artificial intelligence model according to an embodiment of the present disclosure.

FIG. 7 is a view illustrating an artificial intelligence model according to an embodiment of the present disclosure.

Referring to FIG. 7, the processor 180 may determine presence/absence of the second utterance after the non-utterance interval according to the characteristics of the first utterance using the artificial intelligence model.

At this time, the artificial intelligence model may include a classifier used for speech recognition. The artificial intelligence model may include logistic regression, SVM, decision tree, random forest, neural networks, etc. as a classifier.

According to the present disclosure, the artificial intelligence model may use various known algorithms and may include a recurrent neural network (RNN) model. At this time, the RNN may be an artificial intelligence model suitable for learning variable data such as sequence data. The RNN may include a hidden state. At this time, the hidden state is information including the characteristics of previous input data, and, when new input data is input, the RNN may output a result value reflecting information on the entire sequence data by applying a previous hidden state. In addition, according to the present disclosure, the artificial intelligence model may be an LSTM model which is an improved RNN model.

According to the present disclosure, the processor 180 may input the characteristic data of the first utterance as an input value 710 of the artificial intelligence model. At this time, the characteristic data of the first utterance may include sequence data including the speech characteristics and context characteristics of the preprocessed first utterance.

At this time, "the sequence data being input to the artificial intelligence model" may mean that the characteristic data such as words, articles, connective words or connective endings included in the first utterance is sequentially input to the artificial intelligence model in order of time from $X_1$ to $X_t$, as shown in FIG. 7.

According to the present disclosure, when the characteristic data of the first utterance X is input to the artificial intelligence model at a time $X_t$, the hidden state 720 may include a state in which the entire sequence characteristic information of the first utterance reflecting information including the previous characteristics of X at time from $X_1$ to $X_{t-1}$ of the first utterance is stored. The artificial intelligence model may output a result value by applying the characteristic data included in the hidden state 720.

At this time, the result value 730 may include a classification model for determining presence/absence of the second utterance. Specifically, the artificial intelligence model may output "the second utterance is present (1)" or "the second utterance is not present (0)" as the result value 730 according to the characteristics of the first utterance.

Hereinafter, the characteristic data included in the first utterance will be described.

According to the present disclosure, the processor 180 may input the first utterance to the artificial intelligence model, and the artificial intelligence model may include a classification model for extracting the speech characteristics and the context characteristics of the first utterance when the first utterance is received and classifying presence/absence of the second utterance.

At this time, the process of extracting the speech characteristics and the context characteristics of the first utterance may include a preprocessing procedure performed in the artificial intelligence apparatus or an external device.

Specifically, the artificial intelligence model may include an LSTM model trained by extracting the speech characteristics and the context characteristics based on the first utterance. At this time, the speech characteristics may include frame-unit characteristics in the first utterance such as pitch trends including the pitch of the speech data, intensity indicating the intensity of the speech data, general speech characteristics such as spectral stability.

In addition, the context characteristics may include word embedding based on an ASR result included in the first utterance.

With respect to the speech characteristics, the artificial intelligence model may include a model trained to determine that the second utterance is present when the pitch of the first utterance is constantly maintained for a predetermined time or more or when change in the pitch of the first utterance by a predetermined value or more is detected.

For example, the artificial intelligence model assumes that the first utterance is "Turn on the TV. Um". The processor 180 may include a model trained to extract "Turn on the TV. Um" as the first utterance, and determine that the second utterance is present 1) when the pitch of "Um" in "Turn on the TV. Um" is constantly maintained for a predetermined time or more or 2) when change between the pitches of "Turn on the TV" and "Um" in "Turn on the TV. Um" by the predetermined value or more is detected, in the speech characteristics of the extracted first utterance.

This is designed in view of the characteristics indicating that the pitch of the utterance is constantly maintained for a predetermined time ("Um . . . ") and the pitch of the utterance is different (in "Turn on the TV" and "Um", the pitch of "Um" is generally lower), in consideration of the pitch of the utterance including the speech command ("Turn on the TV") and the speech received when the user stutters or thinks ("Um . . . ").

In addition, with respect to the context characteristics, the artificial intelligence model may include a model trained to determine that the second utterance is present when characteristics related to a connective word or a connective ending are present in the context characteristics of the first utterance.

For example, assume that the first utterance is "Turn on the TV and". The artificial intelligence model may include a model trained to extract "Turn on the TV and" as the first utterance and determine that the second utterance is present when the characteristics related to the connective word or the connective ending are present in the context characteristics of the extracted first utterance.

That is, when the characteristics related to the connective word or the connective ending, such as "and", "next", "then" or "after", are present in the ending of the first utterance, the artificial intelligence model may be trained to determine that the second utterance is present. This is designed in consideration of the characteristics that the connective word "and" is included in the ending of the utterance "Turn on the TV and" including the speech command.

Meanwhile, in the present disclosure, determination as to presence/absence of the second utterance using the speech characteristics or the context characteristics is not limited to the above-described speech characteristics or context characteristics.

Hereinafter, the speech data received by the input interface will be described with reference to FIG. 8.

Figure 8:
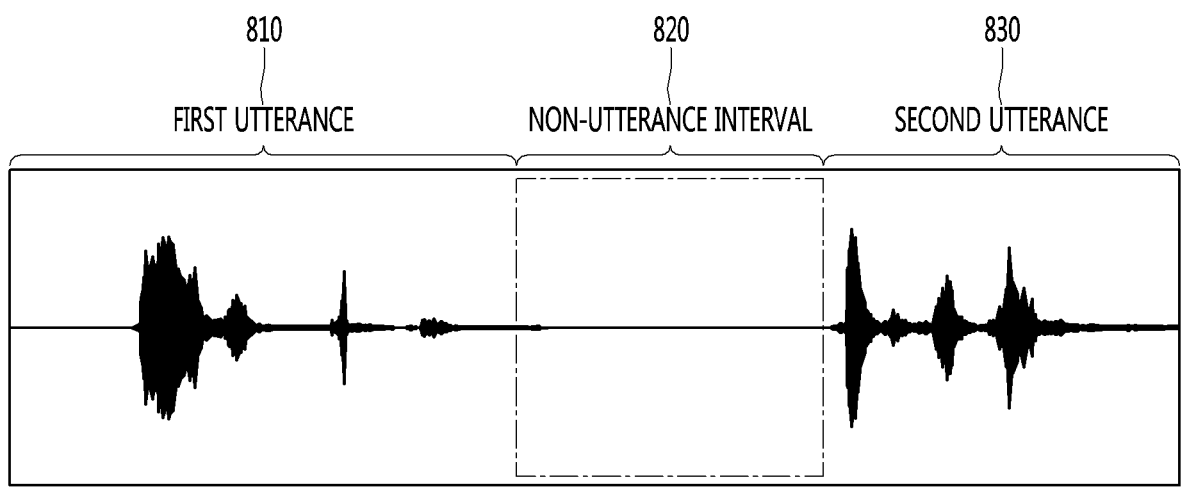
FIG. 8 is a view illustrating an example of utterance according to an embodiment of the present disclosure.

FIG. 8 is a view illustrating an example of utterance according to an embodiment of the present disclosure.

According to the present disclosure, the input interface 12 of the artificial intelligence apparatus may receive speech data spoken by a user. At this time, the speech data may include a waveform including a mixture of a speech and noise.

FIG. 8 shows the waveform of the speech data spoken by the user. The speech data spoken by the user may include a first utterance, a non-utterance interval and a second utterance.

For example, when the speech data "Turn on the TV and . . . mute the TV", "Turn on the TV and" may correspond to the first utterance, " . . . " may correspond to the non-utterance interval, and "mute the TV" may correspond to the second utterance.

The processor 180 may analyze the received speech data to detect the non-utterance interval 820, and extract the speech data after the non-utterance interval 820 as the second utterance upon determining that the second utterance is present according to the characteristics of the first utterance before the non-utterance interval.

Hereinafter, the scenario of the present disclosure will be described.

Figure 9:
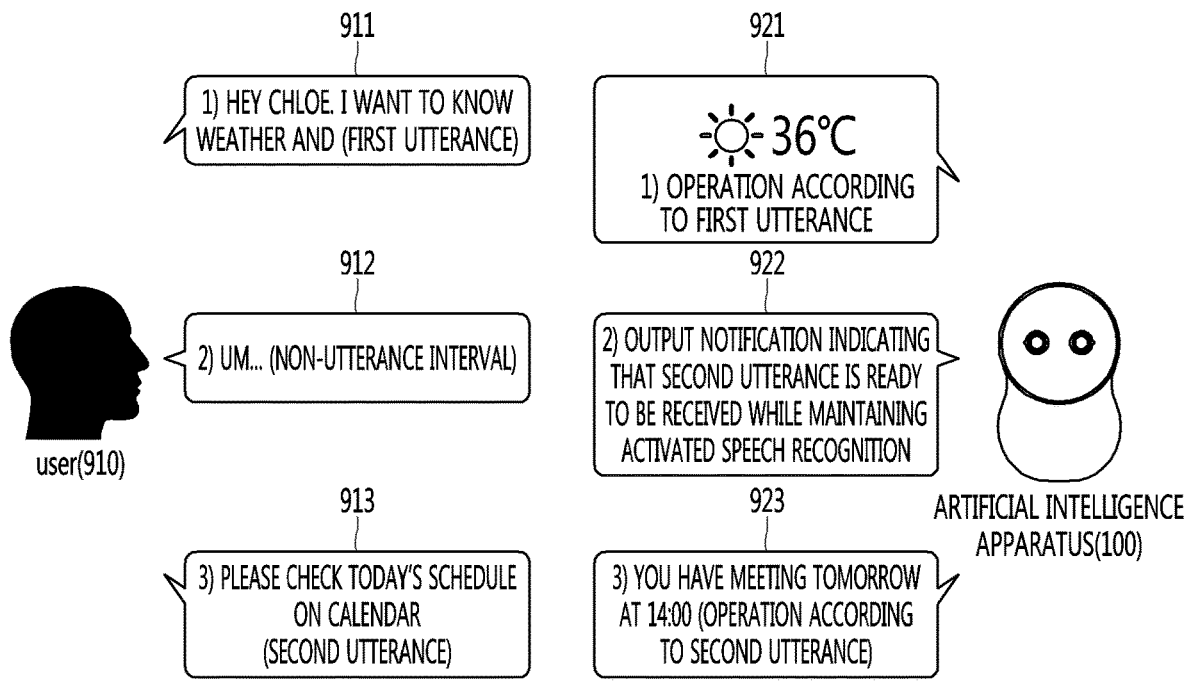
FIG. 9 is a view illustrating a scenario according to an embodiment of the present disclosure.

FIG. 9 is a view illustrating a scenario according to an embodiment of the present disclosure.

According to the present disclosure, the artificial intelligence apparatus 100 may further include an output interface 150 responding to a speech command, and the processor 180 may control the output interface 150 to output a notification indicating that the second utterance is possible while the first speech command is performed.

Specifically, the processor 180 may perform the first speech command according to the first utterance before the non-utterance interval while the second utterance is received. At this time, as the method of performing the first speech command, the processor 180 may control the output interface 150 to perform the output corresponding to the first speech command.

In addition, the processor 180 may output a notification indicating that the second utterance is currently possible while the first speech command is performed.

Hereinafter, the detailed scenario will be described.

In the present disclosure, the user may give a speech command to the artificial intelligence apparatus using speech recognition. For example, assume that the user wants to obtain weather information. The user speaks "Hi LG! I want to know today's weather and . . . ".

The input interface 120 of the artificial intelligence apparatus 100 may receive the speech data according to the utterance of the user "Hi LG! I want to know today's weather and Um . . . ". The processor 180 of the artificial intelligence apparatus 100 may recognize the wakeup word "Hi LG!" and activate the speech recognition function. In addition, the non-utterance interval " . . . " included in the speech data received by the input interface may be detected.

When the non-utterance interval " . . . " exceeds the set time, the processor 180 may extract "I want to know today's weather and" before the non-utterance interval. The processor 180 may input "I want to know today's weather and" to the artificial intelligence model using the first utterance. It is possible to determine whether the second utterance is present via the context characteristics or the speech characteristics of the first utterance.

Specifically, the artificial intelligence model may determine that the second utterance is present, when the pitch of the ending "and" of "want to know today's weather and" of the first utterance is constantly maintained for a predetermined time or more, and maintain the activated speech recognition.

In addition, the artificial intelligence model may determine that the second utterance is present, when change between the pitches of the ending "Um" and "want to know today's weather and" of "want to know today's weather and Um" of the first utterance is equal to or greater than the predetermined value, and maintain the activated speech recognition.

In addition, the artificial intelligence model may determine that the second utterance is present, when there are characteristics related to the connective word or the connective ending such as "and", in consideration of the context characteristics of "want to know today's weather and" of the first utterance, and maintain the activated speech recognition.

Meanwhile, in the present disclosure, the configuration for determining whether the second utterance is present according to the speech characteristics or context characteristics of the first utterance is not limited to the above example.

Upon determining that the result value of the artificial intelligence model according to the characteristics of the first utterance is "the second utterance is present (1), the processor 180 may receive the second utterance after the non-utterance interval "Please check today's schedule on the calendar" as the activated speech recognition is maintained. In addition, while the second utterance is received, the first speech command according to the first utterance "I want to know today's weather and" may be performed. In addition, when the second utterance "Please check today's schedule on the calendar" is received, the second speech command according to the second utterance may be performed.

According to the present disclosure, the processor 180 may control the output interface 150 to output a notification indicating that the first speech command according to reception of the first utterance is performed. At this time, the output interface 150 may be mounted in the artificial intelligence apparatus or may be mounted in the external device to be controlled via the communication interface 110.

Referring to FIG. 9, the processor 180 may control the output interface 150 to perform the first speech command corresponding to the first utterance "I want to know today's weather and". Specifically, an example 921 of the output of the weather is shown in FIG. 9.

In addition, the processor 180 may control the output interface 150 to output a notification 922 indicating that the second utterance is possible while the first speech command is performed (921). For example, the processor 180 may include a method of interacting with the user, such as a method of controlling the lighting of a specific part of the artificial intelligence apparatus (for example, blinking of the eyes of the artificial intelligence apparatus or a method of displaying a specific characteristic or symbol indicating that the speech recognition function is activated), as the notification indicating that the second utterance is possible.

Referring to FIG. 9, the processor 180 may receive the speech data corresponding to the second utterance "check today's schedule on the calendar" while the output interface 150 is controlled to display the weather information corresponding to the first speech command. Thereafter, the processor 180 may perform operation of checking the today's schedule on the calendar corresponding to the second utterance.

In another example, assume that the processor 180 receives the speech data "Please change the channel of the TV, . . . mute the TV". The processor 180 may extract "Turn on the TV" as the first utterance.

In addition, the processor 180 may detect the speech characteristics and context characteristics of "change the channel of the TV and" using the artificial intelligence model and determine that the second utterance "mute the TV" is present. The processor 180 may perform a command corresponding to the first utterance "Please change the change of the TV" while the second utterance "mute the TV" is received.

At this time, the processor 180 may perform control such that the TV does not transmit a sound source, in order to receive the second utterance of the user. In addition, when a channel change command according to the first utterance is performed, the second utterance may be received while the channel is changed without a response (TTS) for interaction with the user. In addition, the processor 180 may control the output interface 150 of the TV and display a notification indicating that the second utterance is possible.

A method of operating an artificial intelligence apparatus may include receiving speech data, detecting a non-utterance interval included in the speech data, and determining presence/absence of a second utterance after the non-utterance interval according to characteristics of a first utterance before the non-utterance interval, when the non-utterance interval exceeds a set time.

The method may further include receiving a wakeup word to activate speech recognition before the first utterance is received and maintaining the activated speech recognition, upon determining that the second utterance is present.

The method may further include performing a first speech command according to the first utterance before the non-utterance interval while the second utterance after the non-utterance interval is received as the activated speech recognition is maintained and performing a second speech command according to the second utterance when the second utterance is received.

The determining of the presence/absence of the second utterance after the non-utterance interval may include acquiring presence/absence of the second utterance output by an artificial intelligence model, by inputting the first utterance to the artificial intelligence model, and the artificial intelligence model may include a classification model for extracting speech characteristics and context characteristics of the first utterance and determining presence/absence of the second utterance, when the first utterance is input.

The artificial intelligence model may be trained to determine that the second utterance is present, when a pitch of the first utterance is constantly maintained for a predetermined time or more or when change in pitch of the first utterance by a predetermined value or more is detected.

The artificial intelligence model may be trained to determine that the second utterance is present, when characteristics related to a connective word or a connective ending are present in the context characteristics of the first utterance.

The method may further include controlling an output interface to output a notification indicating that the second utterance is possible while the first speech command is performed.

The method may further include detecting a second non-utterance interval after the second utterance, determining presence/absence of a third utterance after the second non-utterance interval according to characteristics of the second utterance before the second non-utterance interval, when the second non-utterance interval exceeds the set time, performing the second speech command according to the second utterance before the second non-utterance interval while the third utterance after the second non-utterance interval is received, and performing a third speech command according to the third utterance when the third utterance is received.

The non-utterance interval may be an interval in which an amplitude of the speech data is less than a specific value.

The method may further include receiving the second utterance while a first speech command according to the first utterance is performed, upon determining that the second utterance is present; and performing a second speech command according to the second utterance when the second utterance is received.

According to the present disclosure, by detecting a non-utterance interval between speech data and receiving a second utterance while operation for a first utterance before the non-utterance interval is performed, a wakeup word for activating a speech recognition function again after a speech command for the first utterance is performed is not necessary. Therefore, time delay does not occur when the second utterance is received, and operation according to the additional second utterance can be rapidly performed.

In addition, by using an artificial intelligence model for determining whether the second utterance of the user is present according to the characteristics of the first utterance, it is possible to clearly understand the intention of a user.

Flowcharts according to the present disclosure may be performed regardless of the order or concurrently. That is, they are not constrained in time-series order.

Other implementations are within the scope of the following claims.

The present disclosure can be made in software, firmware or a combination of software and firmware.

The present disclosure may include one or more processors. The one or more processors may include 'the processor 180' or 'a processor for operating an artificial intelligence model'.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus, comprising:
at least one sensor configured to obtain speech data; and
one or more processors configured to:
detect a non-utterance interval included in the speech data, and
determine presence/absence of a second utterance after the non-utterance interval according to characteristics of a first utterance before the non-utterance interval, when the non-utterance interval exceeds a set time, wherein the one or more processors are further configured to: acquire the presence/absence of the second utterance output by an artificial intelligence model by inputting the first utterance to the artificial intelligence model, wherein the artificial intelligence model is a classification model for extracting speech characteristics and context characteristics of the first utterance and determining the presence/absence of the second utterance when the first utterance is input.

2. The artificial intelligence apparatus of claim 1, wherein the one or more processors are further configured to:
obtain a wakeup word to activate speech recognition before the first utterance is obtained, and
maintain the activated speech recognition, upon determining that the second utterance is present.

3. The artificial intelligence apparatus of claim 2, wherein the one or more processors are further configured to:
perform a first speech command according to the first utterance before the non-utterance interval while the second utterance after the non-utterance interval is obtained as the activated speech recognition is maintained, and
perform a second speech command according to the second utterance when the second utterance is obtained.

4. The artificial intelligence apparatus of claim 1, wherein the artificial intelligence model is trained to determine that the second utterance is present, when a pitch of the first utterance is constantly maintained for a predetermined time or more or when change in pitch of the first utterance by a predetermined value or more is detected.

5. The artificial intelligence apparatus of claim 1, wherein the artificial intelligence model is trained to determine that the second utterance is present, when characteristics related to a connective word or a connective ending are present in the context characteristics of the first utterance.

6. The artificial intelligence apparatus of claim 3, further comprising an output interface configured to respond to a speech command,
wherein the one or more processors is further configured to: control the output interface to output a notification indicating that the second utterance is possible while the first speech command is performed.

7. The artificial intelligence apparatus of claim 3, wherein the one or more processors are further configured to:
detect a second non-utterance interval after the second utterance,
determine presence/absence of a third utterance after the second non-utterance interval according to characteristics of the second utterance before the second non-utterance interval, when the second non-utterance interval exceeds the set time,
perform the second speech command according to the second utterance before the second non-utterance interval while the third utterance after the second non-utterance interval is obtained, and
perform a third speech command according to the third utterance when the third utterance is obtained.

8. The artificial intelligence apparatus of claim 1, wherein the non-utterance interval is an interval in which an amplitude of the speech data is less than a specific value.

9. The artificial intelligence apparatus of claim 1, wherein the one or more processors are further configured to:
obtain the second utterance while a first speech command according to the first utterance is performed, upon determining that the second utterance is present, and
perform a second speech command according to the second utterance when the second utterance is obtained.

10. A method of operating an artificial intelligence apparatus, the method comprising:
obtaining speech data;
detecting a non-utterance interval included in the speech data; and
determining presence/absence of a second utterance after the non-utterance interval according to characteristics of a first utterance before the non-utterance interval, when the non-utterance interval exceeds a set time, wherein the method further comprises: acquiring the presence/absence of the second utterance output by an artificial intelligence model by inputting the first utterance to the artificial intelligence model, wherein the artificial intelligence model is a classification model for extracting speech characteristics and context characteristics of the first utterance and determining the presence/absence of the second utterance when the first utterance is input.

11. The method of claim 10, further comprising:
obtaining a wakeup word to activate speech recognition before the first utterance is obtained; and
maintaining the activated speech recognition, upon determining that the second utterance is present.

12. The method of claim 11, further comprising:
performing a first speech command according to the first utterance before the non-utterance interval while the second utterance after the non-utterance interval is obtained as the activated speech recognition is maintained; and
performing a second speech command according to the second utterance when the second utterance is obtained.

13. The method of claim 10, wherein the artificial intelligence model is trained to determine that the second utterance is present, when a pitch of the first utterance is constantly maintained for a predetermined time or more or when change in pitch of the first utterance by a predetermined value or more is detected.

14. The method of claim 10, wherein the artificial intelligence model is trained to determine that the second utterance is present, when characteristics related to a connective word or a connective ending are present in the context characteristics of the first utterance.

15. The method of claim 12, further comprising controlling an output interface to output a notification indicating that the second utterance is possible while the first speech command is performed.

16. The method of claim 12, further comprising:
detecting a second non-utterance interval after the second utterance;
determining presence/absence of a third utterance after the second non-utterance interval according to characteristics of the second utterance before the second non-utterance interval, when the second non-utterance interval exceeds the set time;
performing the second speech command according to the second utterance before the second non-utterance interval while the third utterance after the second non-utterance interval is obtained; and
performing a third speech command according to the third utterance when the third utterance is obtained.

17. The method of claim 10, wherein the non-utterance interval is an interval in which an amplitude of the speech data is less than a specific value.

18. The method of claim 10, further comprising:
obtaining the second utterance while a first speech command according to the first utterance is performed, upon determining that the second utterance is present; and
performing a second speech command according to the second utterance when the second utterance is obtained.

* * * * *